(12) United States Patent
Lee

(10) Patent No.: US 8,352,793 B2
(45) Date of Patent: Jan. 8, 2013

(54) DEVICE TESTING METHOD AND ARCHITECTURE

(75) Inventor: Yongman Lee, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 1136 days.

(21) Appl. No.: 12/239,878

(22) Filed: Sep. 29, 2008

(65) Prior Publication Data

US 2010/0042874 A1 Feb. 18, 2010

Related U.S. Application Data

(60) Provisional application No. 61/089,112, filed on Aug. 15, 2008.

(51) Int. Cl.
*G06F 11/00* (2006.01)

(52) U.S. Cl. .......................... 714/30; 714/724

(58) Field of Classification Search ................. 714/700
See application file for complete search history.

(56) References Cited

U.S. PATENT DOCUMENTS

| | | | |
|---|---|---|---|
| 4,497,056 A * | 1/1985 | Sugamori | 714/736 |
| 4,837,505 A * | 6/1989 | Mitsunobu | 324/750.3 |
| 5,095,231 A * | 3/1992 | Sartori et al. | 326/30 |
| 6,624,625 B2 * | 9/2003 | Naka | 324/750.3 |
| 6,757,327 B1 | 6/2004 | Fiedler | |
| 6,781,405 B2 | 8/2004 | Rajan et al. | |
| 6,895,353 B2 * | 5/2005 | Barr et al. | 702/117 |
| 6,904,375 B1 * | 6/2005 | Sabih et al. | 702/75 |
| 7,102,381 B2 | 9/2006 | Chen et al. | |
| 7,142,007 B2 | 11/2006 | Baecher et al. | |
| 7,372,760 B2 * | 5/2008 | Nagatomi et al. | 365/226 |
| 7,408,379 B2 * | 8/2008 | Cho et al. | 326/30 |
| 7,589,549 B2 * | 9/2009 | Kamo et al. | 324/750.3 |
| 2004/0133834 A1 * | 7/2004 | Kanemitsu et al. | 714/742 |

OTHER PUBLICATIONS

IEEE Std 1394a-2000.*

* cited by examiner

*Primary Examiner* — Steve Nguyen
(74) *Attorney, Agent, or Firm* — Ropes & Gray LLP; Jeffrey H. Ingerman

(57) ABSTRACT

The same testing equipment can be used to test devices operating under different protocols. Where the testing protocol is slower than the native serial protocol of the high-speed serial link connecting the device processor to the component to be tested, the link may be adapted to carry the lower speed testing protocol. This may be accomplished by adding low-speed buffers to the circuits of the serial link, or the serial link may have a native low-speed protocol in addition to its high-speed protocol connections may be made to the pathways for the native low-speed protocol, or the testing protocol may be impressed on top of native low-speed protocol. Where the driver of the device being tested has limited number of pins, the test mode can be controlled by applying power to different power supply input pins.

35 Claims, 13 Drawing Sheets

DEVICE TESTING METHOD AND ARCHITECTURE

CROSS REFERENCE TO RELATED APPLICATION

This claims the benefit of commonly-assigned U.S. Provisional Patent Application No. 61/089,112, filed Aug. 15, 2008, which is hereby incorporated by reference herein in its entirety.

BACKGROUND OF THE INVENTION

This relates to testing of peripheral devices using different communications protocols.

Many kinds of portable electronic devices include processors or systems-on-a-chip (SOCs) that communicate with peripheral components such as memory, displays, or various transducers. Various different protocols are in use in such devices. For example, an older such protocol is the Serial Peripheral Interface (SPI) protocol, while a newer such protocol is the Mobile Industry Processor Interface (MIPI) protocol, which is a high-speed serial interface protocol.

In the assembly of electronic devices, the various components normally will have been tested individually in advance, but it is nevertheless important to test the communications between the components of the assembled devices. However, as new protocols for communications between components are developed, it becomes necessary to have testing equipment and methods for each protocol.

SUMMARY OF THE INVENTION

The present invention allows the same testing equipment to be used to test devices operating under different protocols. Aspects of the invention reside in testing methods, while other aspects of the invention reside in adaptations of the architecture of the devices to be tested, to allow testing and operation under different protocols.

In accordance with a first aspect of the invention, a driver circuit between a peripheral component of a device and the serial link to the processor of the device may have a limited number of signal pins. If the peripheral component were to be tested in its native protocol, this would not be an issue, because the test signals would simply be sent over the serial link in the native protocol. However, where the native protocol is not to be used, and instead a separate test circuit using a different protocol is to be connected to the processor end of the serial link in the place of the processor, then a method to control the driver circuit for testing is provided.

In accordance with this aspect of the invention, a driver circuit that has multiple different power supplies (for multiple different components with which it interfaces) may be placed into a test mode by asserting a test signal on a single pin, and then using different power supply pins to control the testing mode. Thus, there is provided a method of testing a peripheral component of an electronic device, where the peripheral component has a driver circuit with a single test input pin and a plurality of power supply input pins. The method includes asserting a test signal on the test input pin to enter a testing state, and controlling the testing state by applying power to selected one or more of the plurality of power supply input pins.

In accordance with a second aspect of the invention, where the testing protocol is slower than the native serial protocol of the high-speed serial link connecting the device processor to the component to be tested, the link may be adapted to carry the lower speed testing protocol. In a first variant, this may be accomplished by adding low-speed buffers to the circuits of the serial link. In a second variant, the serial link may have a native low-speed protocol in addition to its high-speed protocol and the adaptation of the link may be accomplished by facilitating connections to the pathways for the native low-speed protocol. In a third variant, the serial link may have a native low-speed protocol and the testing protocol may be impressed on top of that protocol. In such a case, the native low-speed protocol would operate over the link, but the data payload of the low-speed protocol signals would be signals according to the testing protocol. Thus, there is provided a method of testing a peripheral component of an electronic device, where the peripheral component has a driver circuit with an interface for receiving signals according to a first signalling protocol. The method includes applying testing signals to the interface according to a second signalling protocol.

In accordance with a third aspect of the invention, the link itself may be calibrated by sending an alternating pattern over the link. The driver circuit need detect only the alternating pattern, rather than having to recognize a random data pattern. This may be facilitated by the addition of hardware modules to both the test apparatus and the driver circuit to send and recognize, respectively, the alternating pattern. Thus, there is provided a method of testing a peripheral component of an electronic device, where the peripheral component has a driver circuit with an interface for receiving test signals. The method includes calibrating a link to the interface by applying to the link signals having a known characteristic, and measuring that characteristic in the driver circuit.

A system architecture, including both a testing apparatus and a peripheral component adapted to be tested, may incorporate one or more of the foregoing aspects of the invention.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

In accordance with this invention, a peripheral component designed to communicate with its host processor using a first, serial protocol may be tested by a testing apparatus designed for a second serial protocol. In the embodiments described herein, MIPI and SPI are examples of two testing protocols. In those particular examples, one protocol (MIPI) is a higher-speed protocol, while the other protocol (SPI) is a lower-speed protocol. However, while certain aspects of the invention relate to the two protocols being of higher and lower speeds, other aspects of the invention may apply regardless of the relative speeds of the two protocols.

The invention may be described with reference to FIGS. 1-10, which describe, as an example, the testing, using the SPI protocol, of a display module (e.g., a liquid-crystal display (LCD) module) used in a portable device that operates under the MIPI protocol. It will be recognized, however, that references to an LCD module and to the SPI and MIPI protocols are exemplary only.

Figure 1:
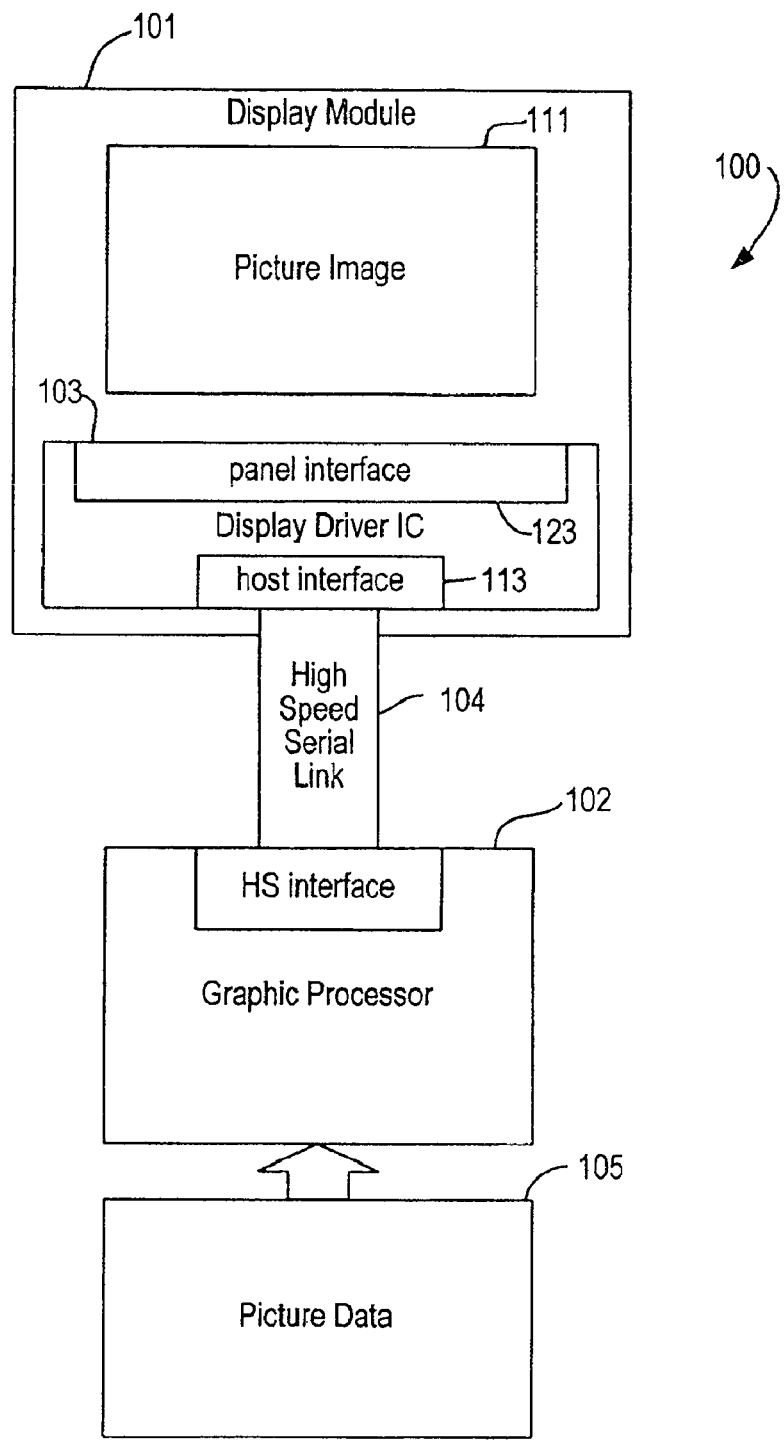
FIG. 1 is a diagram of a conventional testing arrangement for a peripheral component of an electronic device, using the device itself to test the component.

As seen in FIG. 1, a conventional testing system uses the components of device 100 itself to test display module 101. Device 100 includes, in addition to display module 101, a processor 102 and a high-speed serial interface (HSSI) 104 such as a MIPI interface, connecting processor 102 to display module 101. Use of a serial interface allows, for example, the reduction of the number of wires/pins needed to transmit RGB video data to display 101 from 24 wires (eight bits for each of the three color signals) to six wires.

Within display module 101 is a display driver circuit 103, which in addition to driver circuitry includes a host interface 113 that connects to HSSI 104 and a panel interface 123 that connects to the actual LCD panel 111. Testing preferably should test not only display panel 111 itself, but also driver circuit 103 and HSSI 104.

A test image or series of test images 105 may be input to processor 102, and display panel 111 may be observed to see if the test image or images are faithfully reproduced. However, this testing system requires that device 100 already be assembled and therefore does not allow testing of display module 101 before assembly. If a problem is discovered in testing, device 100 would have to be disassembled or discarded.

Figure 2:
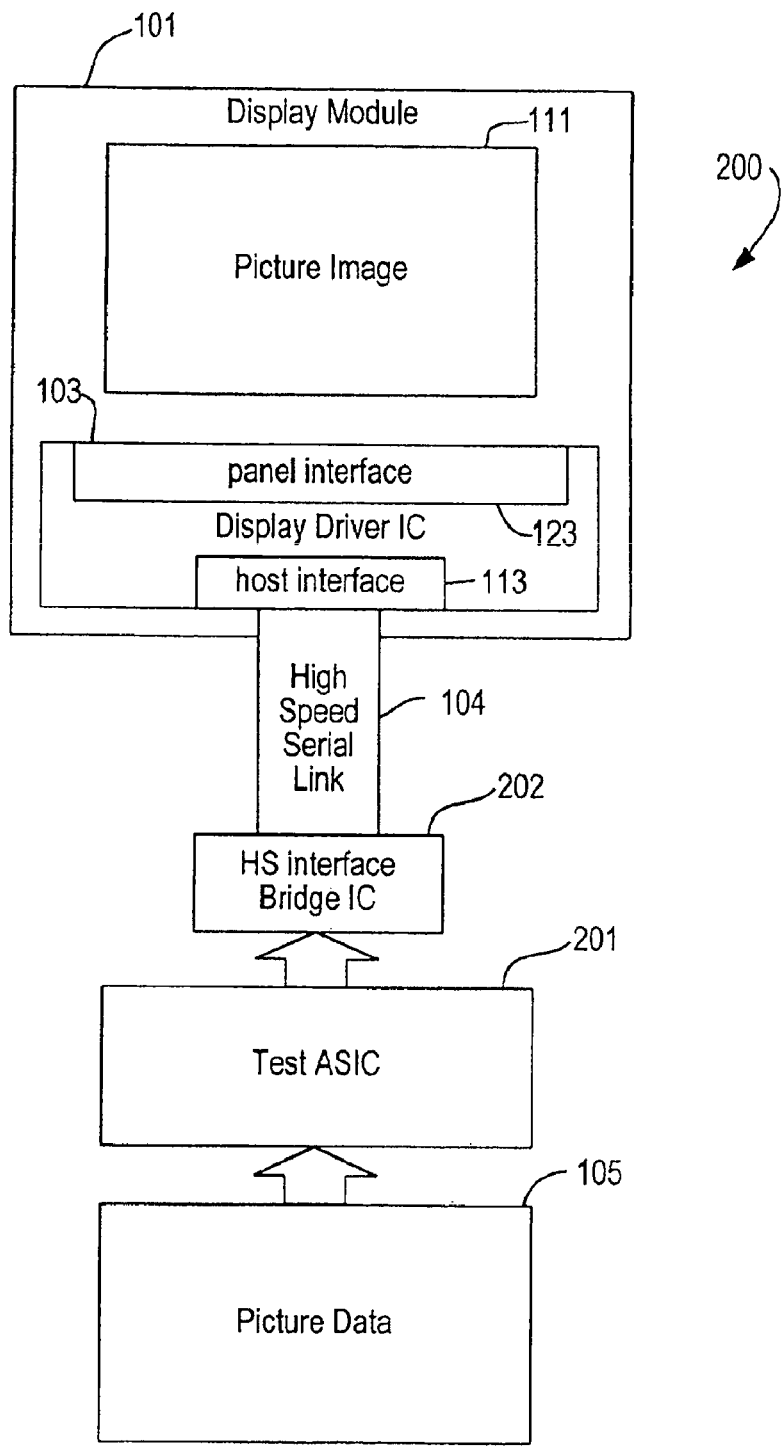
FIG. 2 is a diagram of a known testing arrangement for a peripheral component of an electronic device, using dedicated testing apparatus.

Therefore, it is known to use a test system 200 as shown in FIG. 2, where display module 101 is connected, through HSSI 104, to an application-specific integrated circuit (ASIC) 201 designed to test display module 101. Testing ASIC 201 may operate according to a protocol other than the high-speed protocol of HSSI 104, and therefore a bridge circuit 202 may be provided as an interface between testing ASIC 201 and HSSI 104. A test image or series of test images 105 may be input to testing ASIC 201, and display panel 111 may be observed to see if the test image or images are faithfully reproduced.

Use of the test system of FIG. 2 requires a fully functional bridge circuit 202 that can fully implement the serial protocol of HSSI 104. This requires a complex bridge circuit 202 for each potential pair of protocols used in HSSI 104 and testing ASIC 201. Moreover, as new high-speed serial protocols are developed, new bridge circuits 202 would have to be developed as quickly to be able to use testing ASIC 201.

Figure 3:
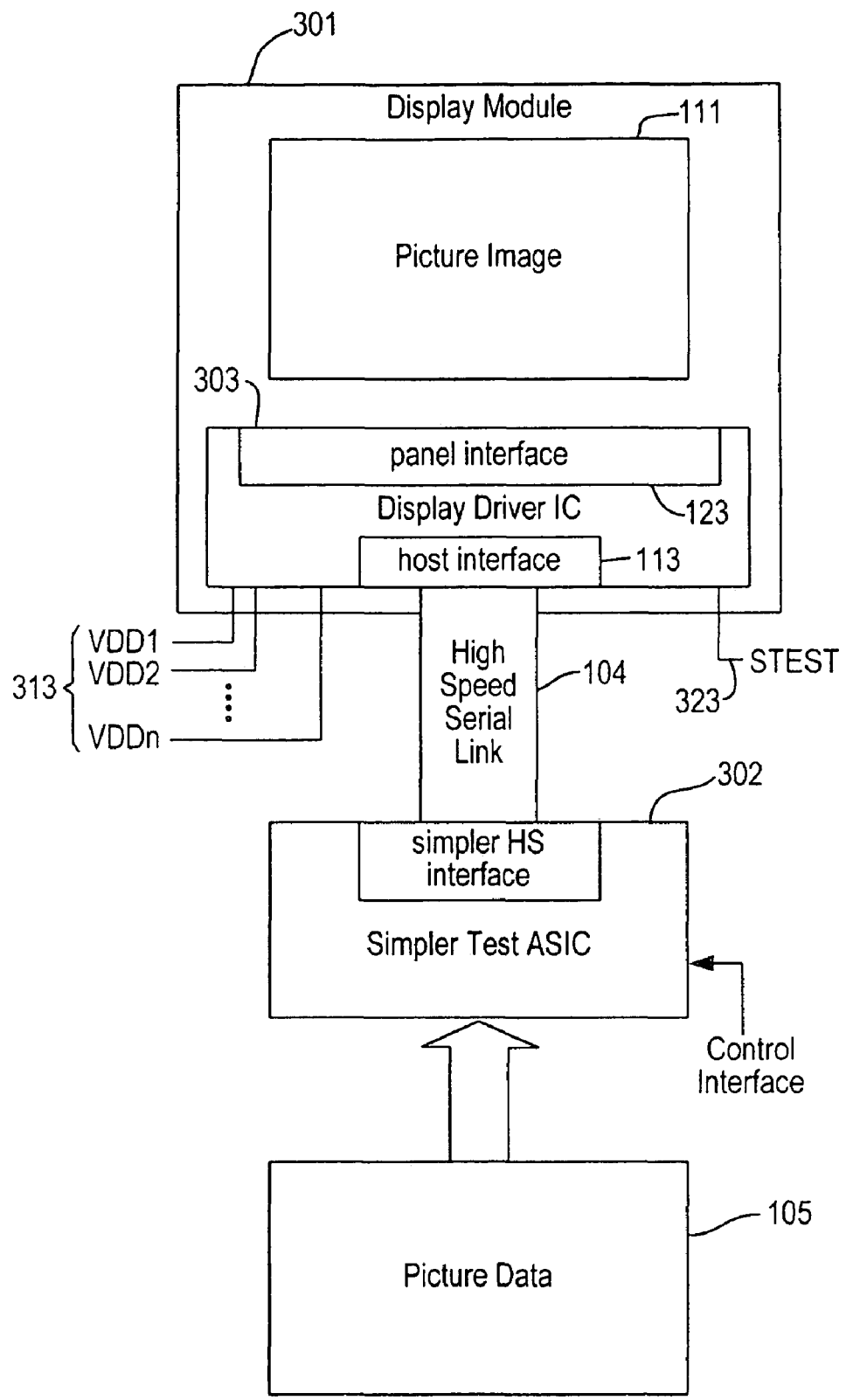
FIG. 3 is a diagram of a testing arrangement for a peripheral component of an electronic device, using dedicated testing apparatus in accordance with the present invention.

Therefore, in accordance with the present invention, as shown in FIG. 3, the requirements for testing ASIC 201 and bridge circuit 202 are reduced by moving more testing functionality into the component 301 to be tested, allowing the use of a simpler testing ASIC 302, which includes a simplified high-speed interface to replace bridge circuit 202.

Thus, one feature of the present invention is the incorporation in driver circuit 303 of some testing functionality previously provided in testing ASIC 201. One such function is the ability to control the enabling of various test modes by direct inputs to driver circuit 303. The number of pins available on driver circuit 303 is limited, and generally they are all assigned to various functions, with one pin STEST 323 provided for testing. However, driver circuit 303 may typically be an ASIC and as such, may include different components with varying power supply needs. Therefore, driver circuit 303 may have a plurality of power supply inputs 313 at, e.g., various different voltage levels. These inputs may be used normally to provide power to different components of driver circuit 303, but when a test input STEST 323 is asserted, the application of one or more of power supply inputs 313 signals to driver circuit 303 causes driver circuit 303 to enter one of several different test modes.

Figure 4:
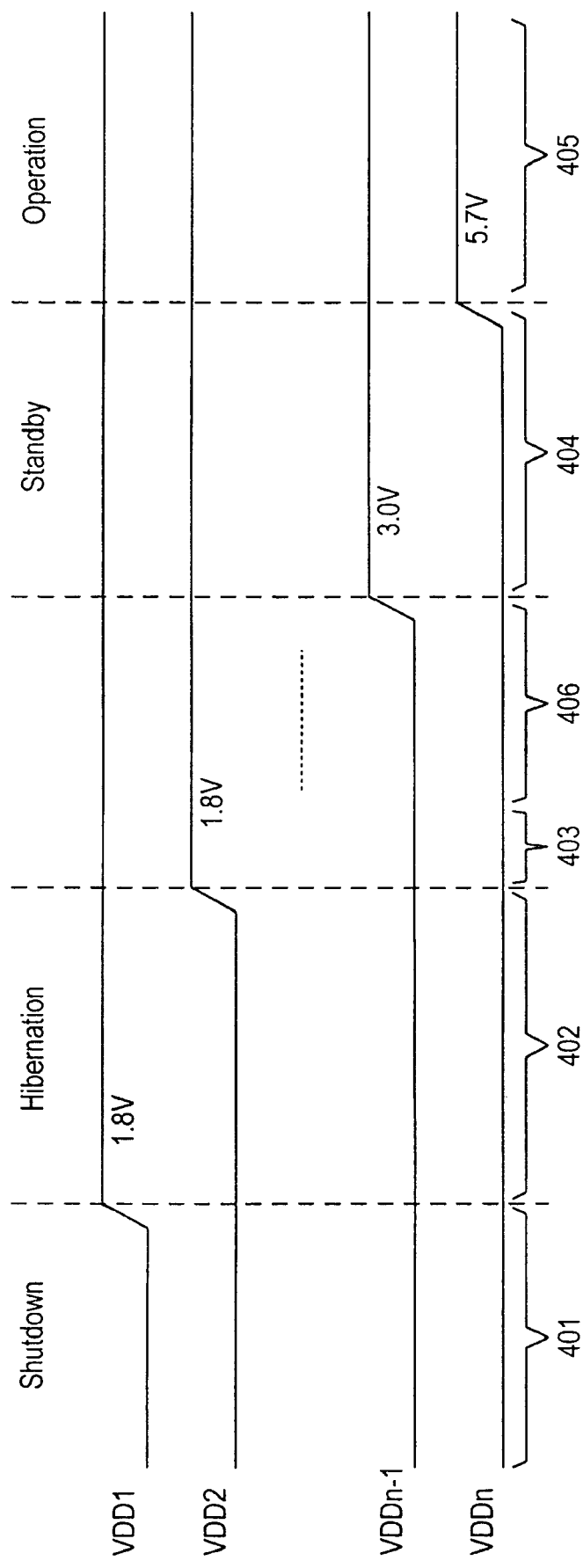
FIG. 4 is a representation of testing signals according to one aspect of a testing method in accordance with the invention.

As seen in FIG. 4, there may be n different power supply inputs 313, labelled VDD1-VDDn. If STEST is not asserted (i.e., STEST=0), then power supply inputs VDD1-VDDn simply supply power to n different portions of driver circuit 303. However, if STEST is asserted (i.e., STEST=1.8V, for example), then power supply inputs VDD1-VDDn may be used to determine which test mode is used to test component 301 including driver circuit 303.

In the different power application modes shown in FIG. 4, there may be no power applied (region 401), power applied only to VDD1 (region 402), power applied only to VDD1 and VDD2 (region 403), power applied to VDD1 through VDDn-1 (region 404) and power applied to all VDD1 through VDDn (region 405). In intermediate region 406, there would be a similar progression of applying power to additional VDD inputs starting with VDD3 and ending with VDDn-2.

In normal operation of driver circuit 303, these different combinations of power supply inputs may invoke various operating modes as suggested by the exemplary labels ("shutdown", "hibernation", "standby", "operate") in FIG. 4. However, when STEST is asserted, each of these combinations of power supply inputs may invoke a different test mode. For example, the test modes may range from a most limited test under limited power supply through increasingly less-limited tests under increasingly greater power supply, to a full test under full power. For example, the simplest test, which may be invoked by VDD1, may be a static test in which various resistances are measured. For example, in the circuit of FIG. 5, the VDD1 power supply would be needed to turn on FET switches 501 so that resistances 502, 503 could be measured using, e.g., voltmeter 504.

It should be noted that although the tests are described above as increasing in degree of power and sophistication as the number of power supplies applied increases, the degree of sophistication may increase or decrease as one steps through the various test modes. Similarly, although the modes have been described as being invoked by sequentially applying additional power supply inputs without deactivating previously applied power supply inputs, the sequence of invoking different testing modes may include deactivating one or more previously applied power supplies as other power supplies are applied.

Figure 6:
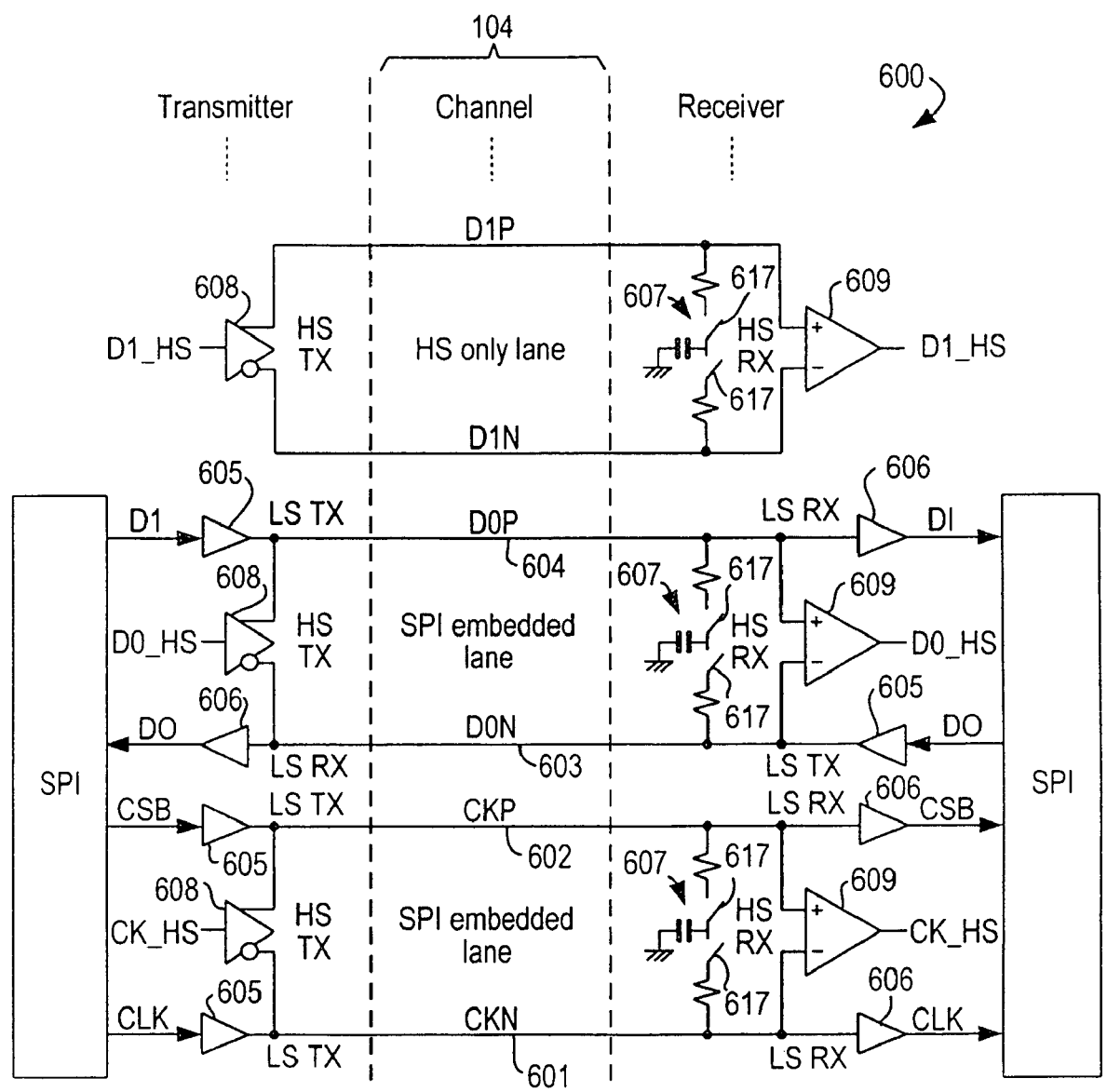
FIG. 6 is a diagram of a first embodiment of the adaptation of a high-speed serial interface to a lower-speed signalling protocol.

The test signals may be sent using a lower-speed protocol such as SPI. Accordingly, the invention may include adapting the SPI signalling onto HSSI 104 which may be configured for a higher-speed protocol such as MIPI. One embodiment 600 of such an adaptation according to the invention is shown in FIG. 6. In this embodiment, six-wire HSSI channel 104 is set up for three differential MIPI signals, CK_HS (high-speed clock), D0_HS (high-speed data$_0$) and D1_HS (high-speed data$_1$). In accordance with this embodiment, four of the six wires are used for four single-ended SPI signals CLK (clock), CSB (chip select), DI (input data) and DO (output data). As an example, in this particular embodiment, the SPI CLK signal is propagated on the negative leg CKN 601 of the MIPI CK_HS signal, the SPI CSB signal is propagated on the positive leg CKP 602 of the MIPI CK_HS signal, the SPI DO signal is propagated on the negative leg DON 603 of the MIPI D0_HS signal, and the SPI DI signal is propagated on the positive leg CKP 604 of the MIPI D0_HS signal.

In order to propagate the low-speed SPI signals on wires 601-604, low-speed buffers 605, 606 are added at the transmit and receive ends, respectively, of each wire 601-604. For the CLK, CSB and DI signals, the transmit end is testing ASIC 302, while for the DO signal, the transmit end is driver circuit 303. Resistor/capacitor arrangement 607 is for prevention of reflection during high-speed (e.g., MIPI) operation, and therefore switches 617 are open during low-speed (e.g., SPI) operation. In addition, the output impedance of each differential high-speed transmitter (HS_TX) 608 and the input impedance of each differential receiver (HS_RX) 609 may be set very high (e.g., to theoretical infinity) during low-speed operation using known techniques so that they do not interfere with the low-speed signals.

Figure 7:
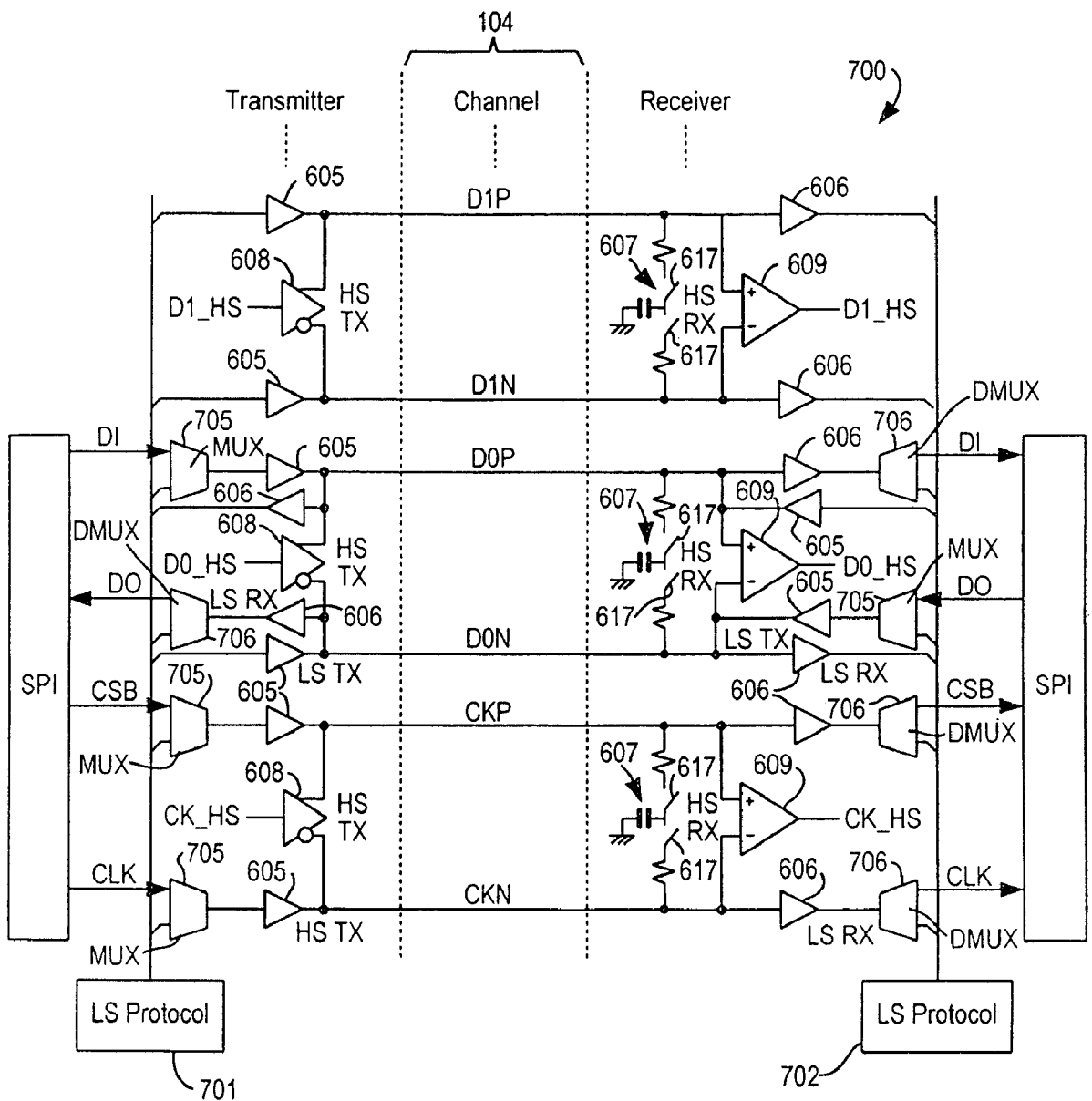
FIG. 7 is a diagram of a second embodiment of the adaptation of a high-speed serial interface to a lower-speed signalling protocol.

Another embodiment 700 of an adaptation of HSSI 104 for low-speed operation according to the invention is shown in FIG. 7. In this embodiment, HSSI 104 has its own native low-speed protocol, including buffers 605, 606 and drivers 701, 702. In this case, buffers 605, 606 need not be added, but the native low-speed protocol drivers 701, 702 should be bypassed using multiplexers 705 and demultiplexers 706. In other respects, embodiment 700 may operate like embodiment 600.

Figure 8:
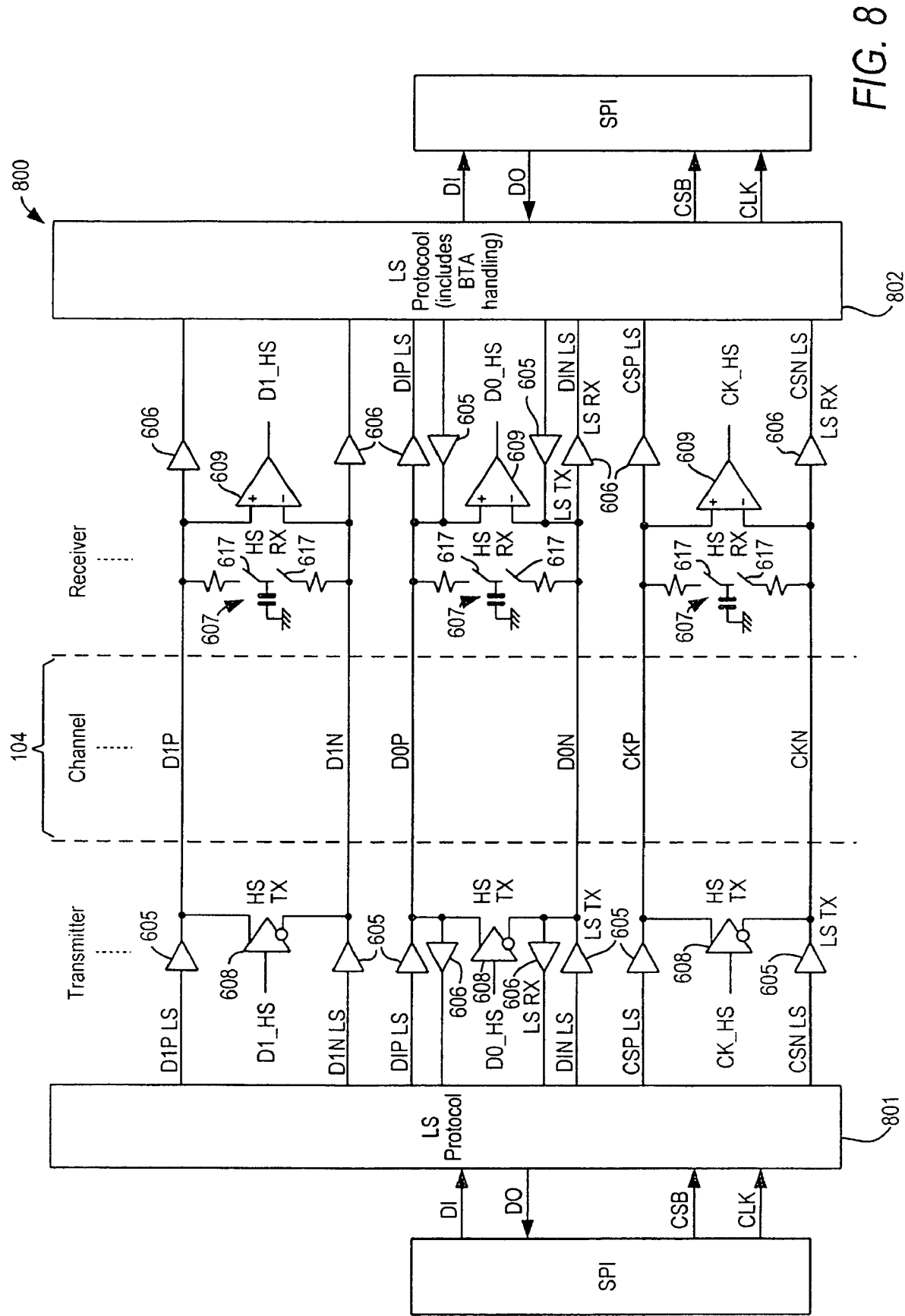
FIG. 8 is a diagram of a third embodiment of the adaptation of a high-speed serial interface to a lower-speed signalling protocol.

A third embodiment 800 of an adaptation of HSSI 104 for low-speed operation according to the invention is shown in FIG. 8. In this embodiment, HSSI 104 has its own native low-speed protocol, including buffers 605, 606 and drivers 801, 802. In this case, unlike embodiment 700, instead of bypassing drivers 801, 802 and using buffers 605, 606 directly, the low-speed (e.g., SPI) signals are transmitted as the data payload of the native low-speed protocol. Thus, driver 801 would encode the low-speed testing signals (e.g., SPI signals) from testing ASIC 302 into the data payload of the native low-speed protocol, and the low-speed testing signals would be extracted from the received native low-speed data by driver 802. Driver 802 may also include Bus-Turn-Around handling to process the return DO data.

Figure 9:
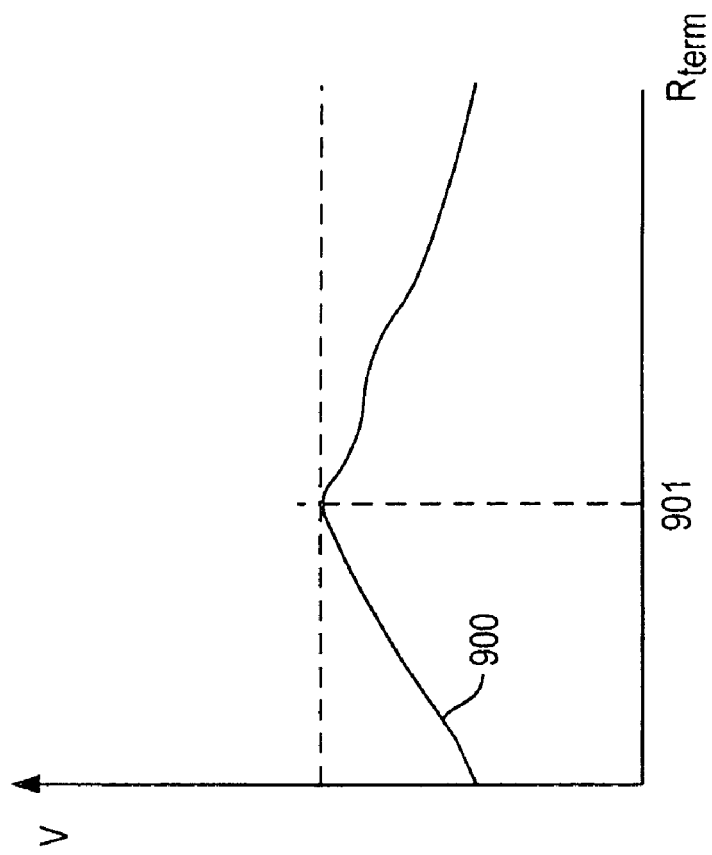
FIG. 9 is a diagram of one method for calibrating a terminal resistance.
Figure 5:
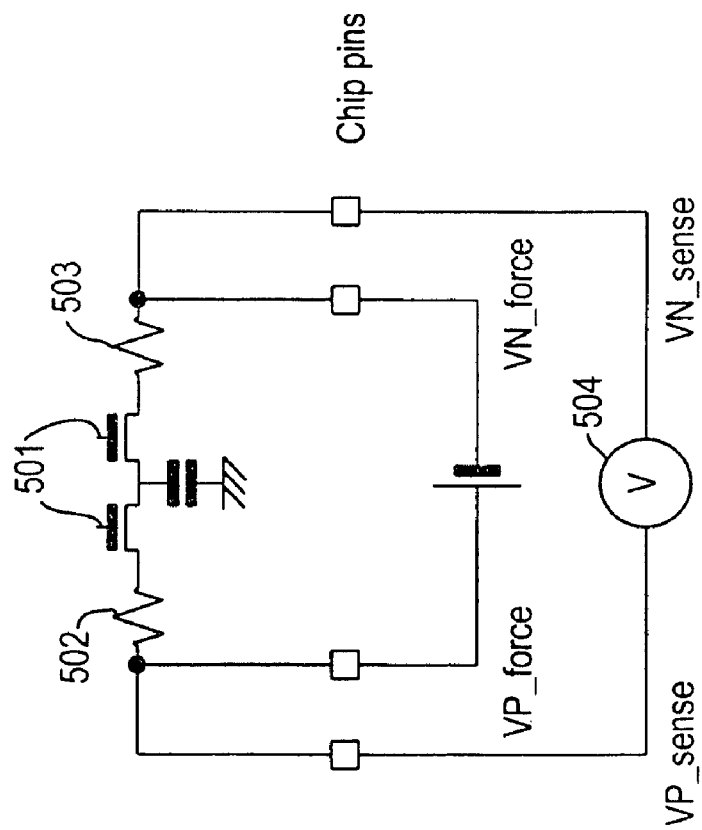
FIG. 5 is a diagram of a circuit tested using the method of FIG. 4.

Regardless of which link adaptation 600, 700, 800 is used, link 104 would operate best if calibrated to match the terminal resistance of driver circuit 303, which may be adjustable, to the link impedance. This may be accomplished by sending an alternating pattern (e.g., 101010 . . . ) on chip-select signal CSB with a fixed (i.e., source-synchronous) clock-data phase relationship (e.g., one bit on each rising and falling clock edge), adjusting the terminal resistance until the phase relationship is maintained. Alternatively, or additionally, the amplitude of the received signal can be measured as the terminal resistance is swept through its full range of values, and the terminal resistance can then be set to the value 901 at which the received amplitude 900 is greatest, as shown in FIG. 9.

Figure 10:
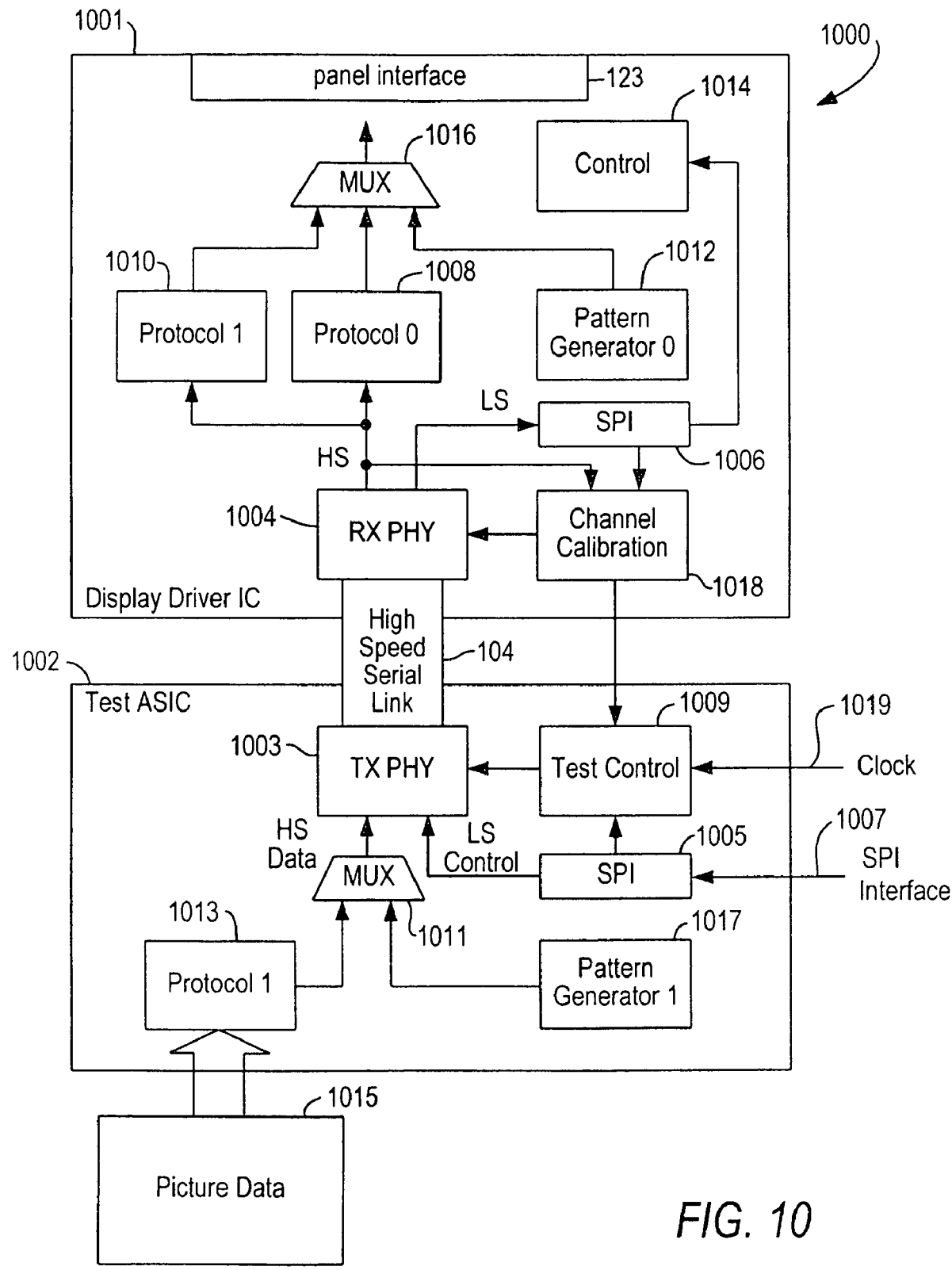
FIG. 10 is a diagram of a system architecture in accordance with the invention.

An embodiment of a system architecture 1000 according to the invention is shown in FIG. 10, including an embodiment 1001 of driver circuit 303, and an embodiment 1002 of testing ASIC 302, connected by HSSI 104. In this architecture 1000, there is a respective physical layer interface 1003, 1004 at the transmitter and receiver ends of HSSI 104 to handle the physical layer of the communications on HSSI 104. For use during low-speed testing, e.g., under the SPI protocol, a respective low-speed interface (e.g., an SPI interface) 1005, 1006 is provided at each end, connected to respective physical layer interface 1003, 1004.

In driver circuit 1001, "Protocol0" interface 1008 is provided for operation of driver circuit 1001 during normal operations, under the native high-speed protocol of driver circuit 1001 (e.g., the MIPI protocol). Similarly, panel interface 123 is the same panel interface described above in connection with FIG. 1 and is used for communicating between driver circuit 1001 and actual display panel 111, whether in testing mode or normal operating mode. A "Protocol1" interface 1010 also is provided for use in one test mode as described below. Finally, a pattern generator 1012 is provided within driver circuit 1001 for use only in testing mode.

A controller 1014 in driver circuit 1001 uses multiplexer 1016 to select "Protocol0" interface 1008, "Protocol1" interface 1010, or a pattern generator 1012 as the input to panel interface 123. Protocol0" interface 1008 would be selected during normal operation. In one testing mode, as determined, e.g., by SPI interface 1007, controller 1014 would select Protocol1" interface 1010. In that mode, test controller 1009 of testing ASIC 1002 similarly would use multiplexer 1011 to select a compatible Protocol1 interface 1013. Protocol1 may be a simplified version, for testing purposes, of the native high-speed protocol (e.g., MIPI). For example, the simplified protocol might have no packet headers or footers, and the data payload might not be encoded, with the goal of simplifying the overhead, primarily in driver circuit 1001, where the testing components are used essentially once and then rarely if ever used again. This simplified protocol can be used to send picture data 1015 from testing ASIC 1002 to display panel 111, and the rendering of picture data 1015 on display panel 111 can be observed to evaluate the functioning of display module 101, including not only display panel 111 but driver circuit 1001 itself.

Figure 11:
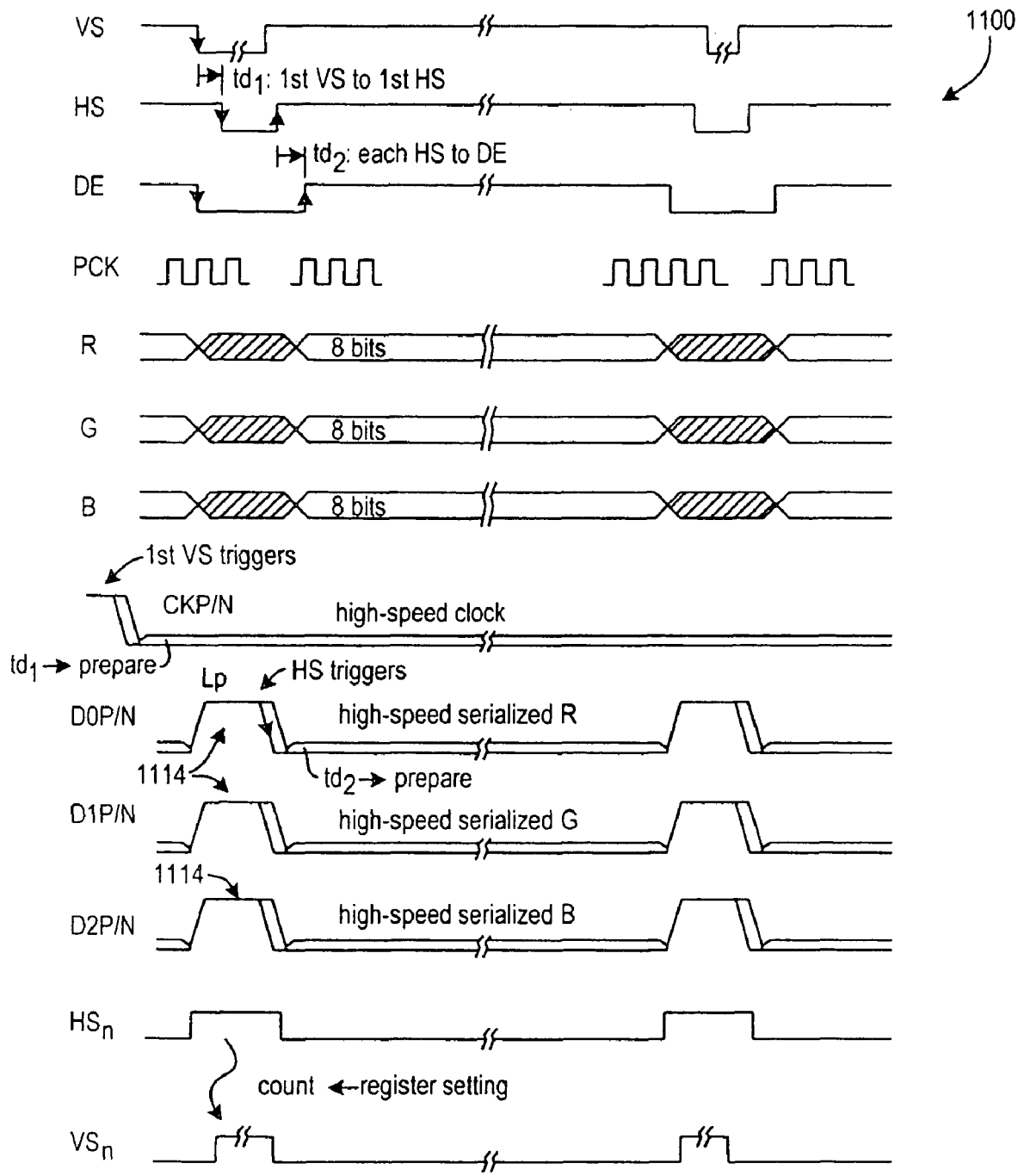
FIG. 11 is an example of the signals incorporated in one embodiment of a testing protocol used with the present invention.

One example of a simplified protocol 1100 which may be used as Protocol1 is shown in FIG. 11. Protocol 1100 is a simplified version of a conventional 24-bit parallel RGB video interface protocol, which includes signals VS (vertical sync), HS (horizontal sync), DE (data enable), PCK (pixel clock), and the three 8-bit parallel color component data signals R, G and B.

Figure 12:
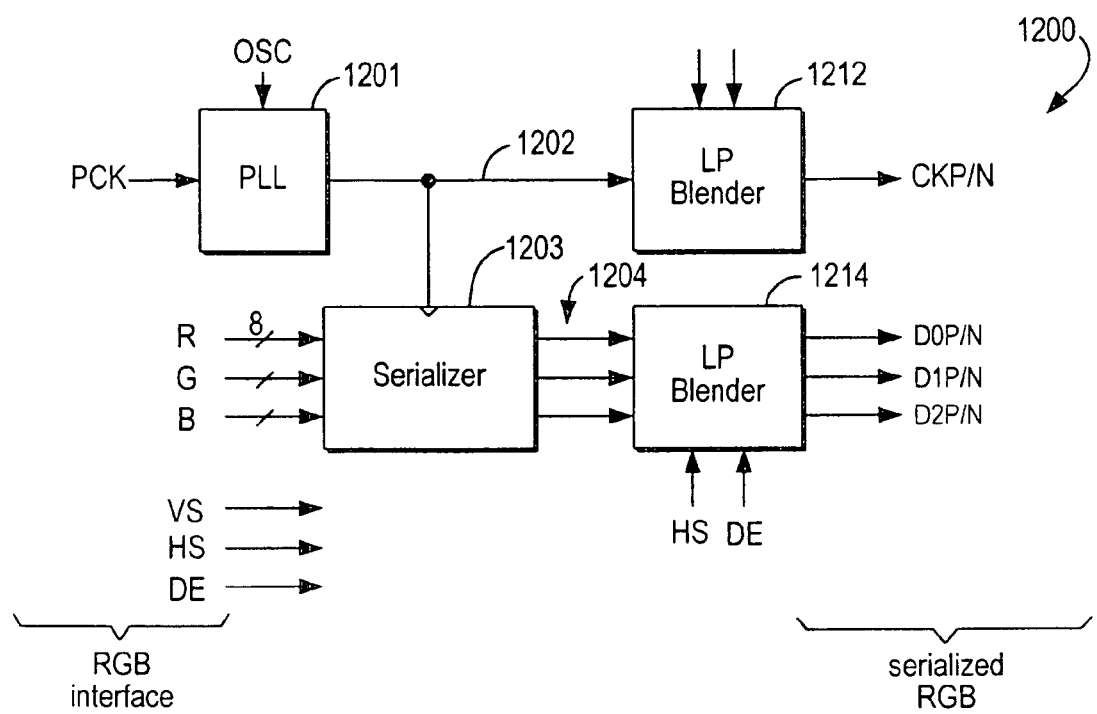
FIG. 12 is a diagram of circuitry for combining high-speed and low-power signals onto a single serial protocol such as that of FIG. 11.

The R, G and B data signals may be serialized using circuitry 1200 of FIG. 12, in which the RGB data are pipelined in synchronization with the pixel clock PCK. Pixel clock PCK is synchronized by a high-speed clock 1202 generated using phase-locked loop 1201 and is used to clock serializer 1203.

In the MIPI-SPI example discussed above, a MIPI receiver will be expecting high-speed differential signals at, e.g., 0.2V, and a low-power signal at, e.g., 1.2V, and is able to distinguish between them. However, in the serial interface of the invention, there are a limited number of wires available to transmit those signals. Therefore, in accordance with the invention, low-power signals such as the sync signals are embedded in the high-speed differential data signals as a form of added low-power ("LP") signal. The first VS and first HS signals are blended with high-speed clock 1202 by LP blender circuit 1212 to produce a differential high-speed clock signal CKP/N in which peak 1112 represents the embedded low-power first sync signal. Similarly, the HS and DE signals are blended with serialized RGB signals 1204 by LP blender circuit 1214 to produce differential high-speed RGB data signals D0P/N, D1P/N and D2P/N, in which peaks 1114 represent the embedded low-power sync and enable signals.

In this arrangement, timing can be controlled as follows:
(1) For high-speed clock initialization and transmission:
   first falling edge of VS starts state LP10
   the elapse of a certain number of high speed clock cycles (e.g., 64 clocks) starts state LP00
   a subsequent HS falling edge ends HS_prepare period
   differential clock runs from that point onward
   clock rises to LP11 state by external reset
(2) For high-speed data transmission:
   every DE falling edge starts state LP11
   a subsequent HS rising edge starts state LP10
   the elapse of a certain number of high speed clock cycles (e.g., 64 clocks) starts state LP00
   a subsequent DE rising edge ends HS prepare period
   differential data runs from that point onward
   result=DE signal is embedded into high-speed RGB data in sync with the high-speed clock In another testing mode according to the invention, controller 1014 can select pattern generator 1012 as the video source. Pattern generator 1012 can be small as about 100 logic gates and be able to generate the necessary test patterns to evaluate the functioning of at least display panel 111. Providing pattern generator 1012 in driver circuit 1001 relieves the burden on link 104 from having to carry the test data, particularly when using a low-speed protocol. As a variant of this embodiment, pattern generator 1017 can be provided in testing ASIC 1002. Although the test patterns would still have to be carried on link 104, there would be no need to communicate the test data 1015 to testing ASIC 1002 (e.g., via a DVI, USB or RGB interface), so the burden on testing architecture 1000 is still reduced.

Finally, channel calibration module 1018 in driver circuit 1001 works with test controller 1009 of testing ASIC 1002 and system clock 1019 to calibrate the channel as described above. In particular, in actual use of component 301, where the data received is always different, bit error rate testing would require transmission to component 301 of a pattern, recovery of the pattern by component 301, loopback transmission of the recovered pattern, and comparison at the source of the looped-back data to the original pattern.

Figure 13:
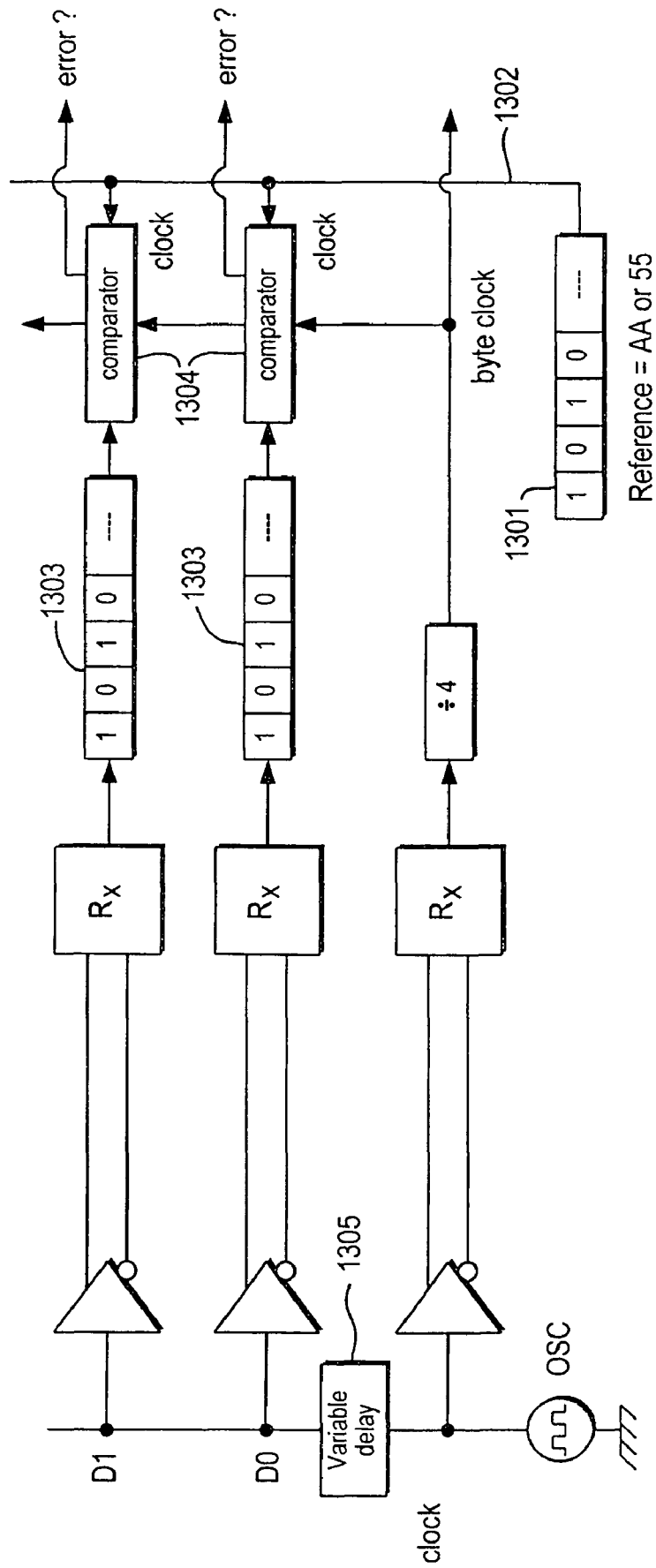
FIG. 13 is a diagram of a calibration method and circuitry according to an embodiment of the present invention.

In accordance with the invention, as shown in FIG. 13, component 301 can include a reference pattern generator 1301 that generates a predetermined "known" test pattern 1302, such as a simple alternating 1-0-1-0 pattern. In a test mode, that same predetermined pattern can be sent from the transmitter to component 301 where comparators 1304 can compare the recovered byte 1303 to pattern 1302 and generate an error if the patterns do not match. The number of received bits and the number of error bits can be recorded in registers. A bit error rate (BER) may be calculated as the ratio between them: BER=number of error bits/number of received bits.

Figure 14:
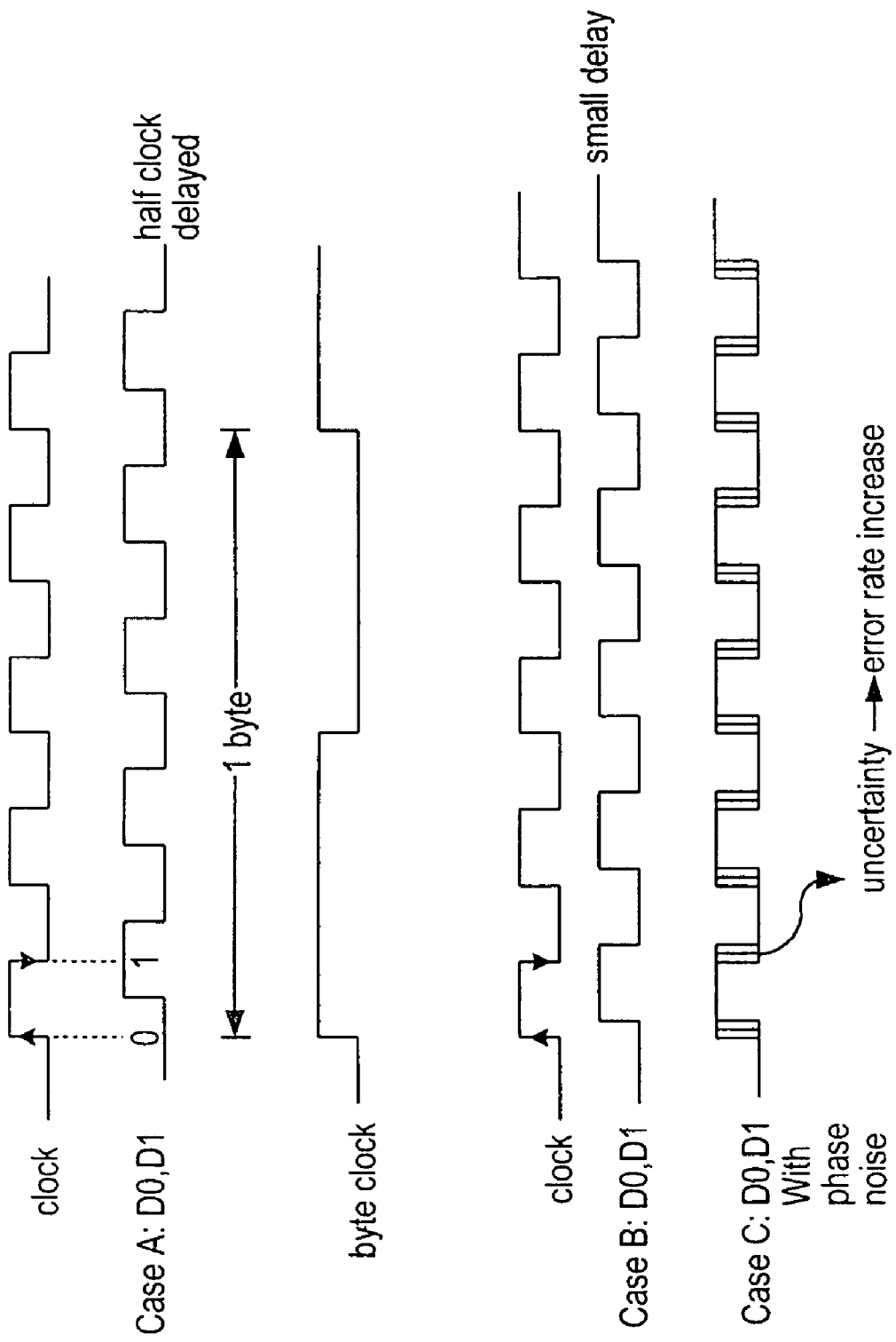
FIG. 14 is timing diagram showing various mismatch conditions that may be encountered during calibration.

As seen in FIG. 14, because the data are sent in the form of the delayed clock through the variable delay 1305 in the transmitter, the quality of reception can be tested by changing the delay. It may be preferable to delay the data by half a clock as in case A. If the rising and falling edges of clock move away from the middle of data bit, and closer to one end, as in case B, a certain probability of misalignment of clock and data may appears at the receiver end because of noise in the channel. Case C shows the accumulation of the edge uncertainty at the receiver end. Because the condition of the receiver may affect the number of errors caused by such delay of data against the clock edges, the quality of receiver can be measured against the amount of shift. As discussed above, the termination resistance can be varied to find the minimum phase error. If a large range of termination resistance provides the minimum phase error, the termination resistance may be set to any value in that range, but preferably may be set to the midpoint of the range.

Thus it is seen that apparatus and methods for testing a peripheral component of a device using a protocol other than the native protocol of the device, have been provided. It will be understood that the foregoing is only illustrative of the principles of the invention, and that various modifications can be made by those skilled in the art without departing from the scope and spirit of the invention, and the present invention is limited only by the claims that follow.

What is claimed is:

1. A method of testing a peripheral component of an electronic device, the peripheral component having a driver circuit with a single test input pin and a plurality of power supply input pins separate from the test input pin; the method comprising:
   asserting a test signal on the test input pin to enter a testing state; and
   selecting, when in the testing state, a test mode from among a plurality of test modes of differing complexity by applying power to selected one or more of the plurality of power supply input pins separate from the test input pin, wherein the complexity of the test mode that is selected from among the plurality of test modes is directly proportional to how many of the power supply input pins power is applied to.

2. The method of claim 1 wherein:
   power is applied to only one of the power supply input pins; and
   the test mode that is selected from among the plurality of test modes is a static test mode.

3. The method of claim 2 wherein, in the static test mode, resistances within the component are measured.

4. The method of claim 1 wherein:
   the driver circuit includes an interface for receiving signals according to a first signalling protocol; and
   the method further comprises:
   applying testing signals, according to a second signalling protocol, to the interface for receiving signals according to the first signalling protocol.

5. The method of claim 4 wherein the applying comprises transmitting the signals as data payload according to the first signalling protocol.

6. The method of claim 5 wherein:
   the second signalling protocol is slower than the first signalling protocol;
   the first signalling protocol has a native low-speed version; and
   the applying comprises transmitting the signals as data payload according to the low-speed version of the first signalling protocol.

7. The method of claim 4 wherein:
the second signalling protocol is slower than the first signalling protocol;
the first signalling protocol has a native low-speed version; and
the applying comprises bypassing the low-speed version of the first signalling protocol.

8. The method of claim 7 wherein the bypassing comprises adding buffers to a signalling link for the first signalling protocol.

9. The method of claim 8 wherein the bypassing comprises reusing buffers on a signalling link for the first signalling protocol.

10. The method of claim 4 further comprising generating additional testing signals within the driver circuit.

11. The method of claim 1 further comprising generating additional testing signals within the driver circuit.

12. The method of claim 1 wherein:
the driver circuit includes an interface for receiving test signals; and
the method further comprises:
calibrating a link to the interface by applying to the link signals having a known characteristic, and measuring the characteristic in the driver circuit.

13. The method of claim 12 wherein the characteristic is a phase relationship.

14. The method of claim 12 wherein:
the characteristic is amplitude;
the measuring comprises varying a variable resistance in the driver circuit and recording the amplitude during the varying.

15. The method of claim 14 further comprising selecting a value of the variable resistance corresponding to a maximum amplitude during the varying.

16. Apparatus for testing a peripheral component of an electronic device, the peripheral component having:
a driver circuit with a single test input pin and a plurality of power supply input pins separate from the test input pin, and
a controller that varies a testing state according to how many of the power supply input pins power is applied to;
the apparatus comprising:
circuitry for asserting a test signal on the test input pin to enter the testing state; and
circuitry for applying power to selected one or more of the plurality of power supply input pins to control select, when in the testing state, a test mode from among a plurality of test modes of differing complexity, wherein the complexity of the test mode that is selected from among the plurality of test modes is directly proportional to how many of the power supply input pins power is applied to.

17. The apparatus of claim 16 wherein:
the driver circuit includes an interface for receiving signals according to a first signalling protocol; and
the apparatus further comprises:
circuitry for applying testing signals, according to a second signalling protocol, to the interface for receiving signals according to the first signalling protocol.

18. The apparatus of claim 17 wherein the circuitry for applying testing signals transmits the signals as data payload according to the first signalling protocol.

19. The apparatus of claim 18 wherein:
the second signalling protocol is slower than the first signalling protocol;
the first signalling protocol has a native low-speed version; and
the circuitry for applying testing signals transmits the signals as data payload according to the low-speed version of the first signalling protocol.

20. The apparatus of claim 17 wherein:
the second signalling protocol is slower than the first signalling protocol;
the first signalling protocol has a native low-speed version; and
the circuitry for applying testing signals comprises circuitry for bypassing the low-speed version of the first signalling protocol.

21. The apparatus of claim 20 wherein the circuitry for bypassing comprises at least one multiplexer.

22. The apparatus of claim 17 wherein:
the signals are applied to the interface via a link;
the second signalling protocol is slower than the first signalling protocol; and
the circuitry for applying testing signals comprises buffers on the link to accommodate the slower second signalling protocol.

23. The apparatus of claim 16 further comprising a signal generator for generating additional testing signals.

24. The apparatus of claim 23 wherein the signal generator is located within the driver circuit.

25. A system comprising:
a peripheral component of an electronic device, the peripheral component having:
a driver circuit with a single test input pin and a plurality of power supply input pins separate from the test input pin, and
a controller that varies a testing state according to how many of the power supply input pins power is applied to; and
apparatus for testing the peripheral component, the apparatus comprising:
circuitry for asserting a test signal on the test input pin to enter the testing state, and
circuitry for applying power to selected one or more of the plurality of power supply input pins to select, when in the testing state, a test mode from among a plurality of test modes of differing complexity, wherein the complexity of the test mode that is selected from among the plurality of test modes is directly proportional to how many of the power supply input pins power is applied to.

26. The system of claim 25 further comprising:
an interface in the driver circuit for receiving signals according to a first signalling protocol; and
circuitry for applying testing signals, according to a second signalling protocol, to the interface for receiving signals according to the first signalling protocol.

27. The system of claim 26 wherein:
the signals are applied to the interface via a link;
the second signalling protocol is slower than the first signalling protocol; and
the circuitry for applying testing signals comprises buffers on the link to accommodate the slower second signalling protocol.

28. The system of claim 26 wherein the circuitry for applying testing signals transmits the signals as data payload according to the first signalling protocol.

29. The system of claim 28 wherein:
the second signalling protocol is slower than the first signalling protocol;

the first signalling protocol has a native low-speed version; and the circuitry for applying testing signals transmits the signals as data payload according to the low-speed version of the first signalling protocol.

30. The system of claim 26 wherein:
the second signalling protocol is slower than the first signalling protocol;
the first signalling protocol has a native low-speed version; and
the circuitry for applying testing signals comprises circuitry for bypassing the low-speed version of the first signalling protocol.

31. The system of claim 30 wherein the circuitry for bypassing comprises at least one multiplexer.

32. The system of claim 26 wherein:
the circuitry for applying testing signals comprises a first protocol generator in the driver circuit and a second protocol generator in the testing apparatus;
the first protocol generator and the second protocol generator operate under a simplified version of the first signalling protocol.

33. The system of claim 25 further comprising a signal generator for generating additional testing signals.

34. The system of claim 33 wherein the signal generator is located within the driver circuit.

35. The system of claim 33 wherein the signal generator is located within the apparatus for testing.

* * * * *